United States Patent [19]
Cramblet

[11] 3,734,560
[45] May 22, 1973

[54] RETRACTABLE HINGE STRUCTURE FOR A TRUCK TAILGATE

[76] Inventor: Charles D. Cramblet, 894 Elm Street, Sweet Home, Oreg. 97386

[22] Filed: May 20, 1971

[21] Appl. No.: 145,427

[52] U.S. Cl. ........................296/50, 16/176, 49/194, 296/57 R
[51] Int. Cl. ................................................B50j 5/10
[58] Field of Search ......................296/50, 51, 57 R; 49/194, 195, 196; 16/176; 292/254, 175

[56] References Cited

UNITED STATES PATENTS

| | | | |
|---|---|---|---|
| 3,143,760 | 8/1964 | Ferguson | 16/176 |
| 698,216 | 4/1902 | Newman | 16/176 |
| 2,239,734 | 4/1941 | Pratt | 16/176 |
| 2,742,317 | 4/1956 | Chandler | 296/57 R X |
| 2,821,431 | 1/1958 | Crompton | 296/57 R |
| 2,990,215 | 6/1961 | May | 296/57 R |

FOREIGN PATENTS OR APPLICATIONS 1,068,085   6/1954   France ................................16/176

*Primary Examiner*—Kenneth H. Betts
*Assistant Examiner*—John A. Pekar
*Attorney*—James D. Givnan, Jr.

[57] ABSTRACT

Hinge structure carried by a truck engageable with the truck tailgate and retractable into the truck for disengagement from the tailgate permitting convenient tailgate removal and re-installation. A hinge pin is spring biased outwardly into tailgate engagement with manual release means permitting opposite hinge pin movement during tailgate disengagement. A housing carries the hinge pin in a captive manner.

3 Claims, 3 Drawing Figures

PATENTED MAY 22 1973 3,734,560

INVENTOR
CHARLES D. CRAMBLET
BY
AGENT

RETRACTABLE HINGE STRUCTURE FOR A TRUCK TAILGATE

BACKGROUND OF THE INVENTION

The present invention relates generally to hinge structure and more particularly to such structure engageable with and swingably supporting a truck tailgate.

The prior art, to the extent I am aware, discloses removable tailgate structures for load carrying vehicles with such tailgate structures embodying slidable hinge pins extendable from the tailgate into hinge members in the truck box. The approach taken in this area, for the most part, has been to substantially modify the tailgate structure to incorporate retractable hinge pins.

The current popularity of camper units, commonly carried within the elongate box of "pick-up" trucks, has emphasized the need for a conveniently removable tailgate. The alternating use of such a truck for camper transport and work requires that the tailgate be removed and reinstalled quite often requiring considerable manual effort at each instance.

SUMMARY OF THE INVENTION

The instant invention comprehends a hinge structure for use with existing truck box and tailgate structures and includes a retractable hinge pin carried by the truck box for inserted engagement with the tailgate. The present hinge is permanently installed within the truck box and may be substituted for the originally installed tailgate hinge structure. A manually retractable hinge pin engages the tailgate structure which typically incorporates a hinge pin receptacle.

The primary object of the invention is the provision of a novel hinge structure permitting the convenient removal and, oppositely, the installation of a truck tailgate to suit the use to which the truck is put.

A further object is the provision of hinge means adaptable for use with existing truck and tailgate structure without requiring costly modification to either. The novel hinge structure may be installed in place of the original hinge structure and with installation entailing only the forming of a small, circular opening in the truck box. Use is made of existing truck box configuration in that existing fastener openings and recesses therein lend themselves to use with the present structure.

Another important object of the invention is to provide a novel hinge structure, the installation of which does not alter the external appearance of the truck.

BRIEF DESCRIPTION OF THE DRAWING

With reference to the accompanying drawing.

DESCRIPTION OF THE PREFERRED EMBODIMENT

Figures 1, 2, 3:
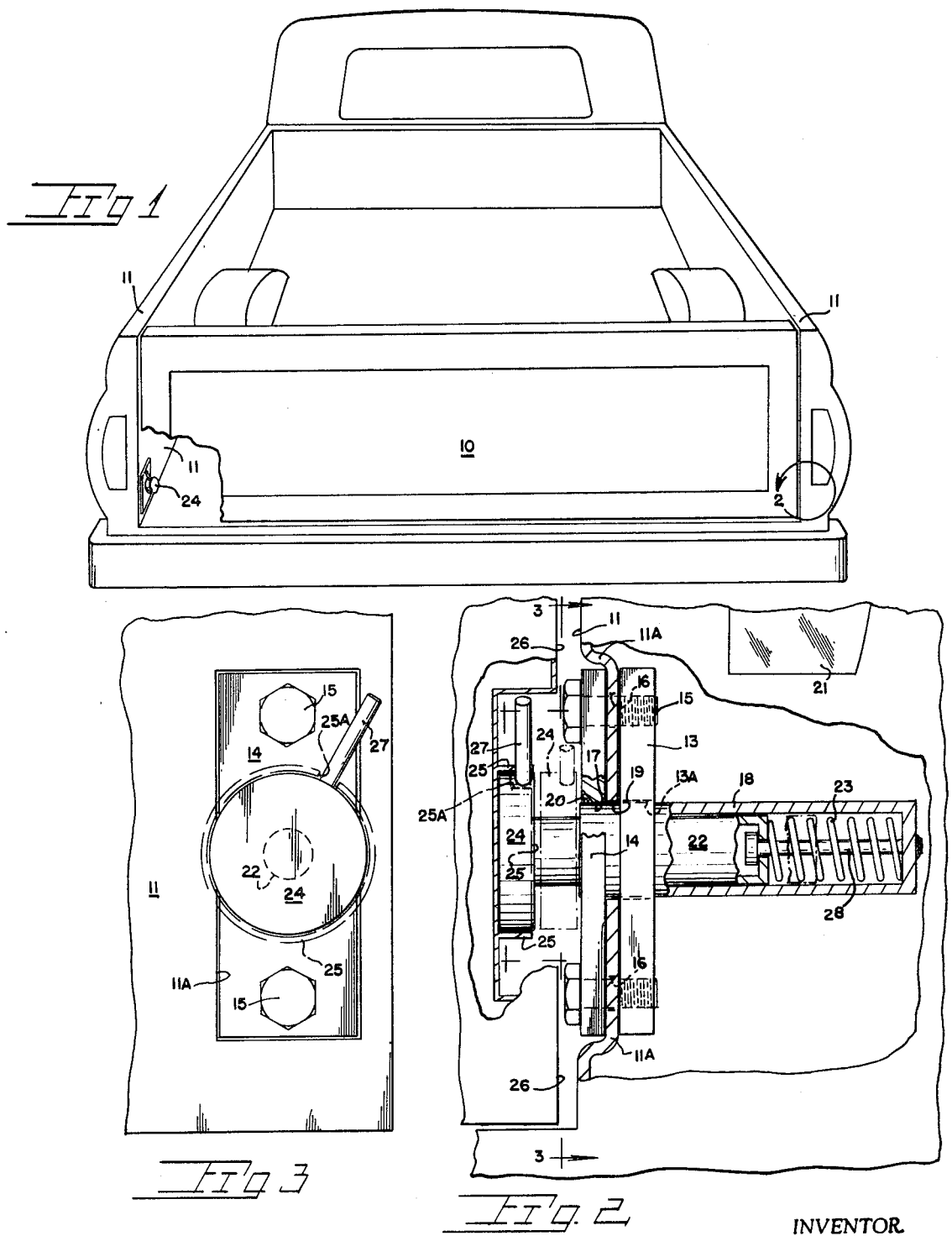
FIG. 1 is a rear perspective view of a "pick-up" truck with the present invention installed at the conventional tailgate hinge locations.
FIG. 2 is an enlarged detail view of that portion of the truck box and tailgate encircled at 2 in FIG. 1 with fragments removed for purposes of illustration.
FIG. 3 is an elevational view of FIG. 2 taken substantially along irregular line 3—3 thereof.

With continuing reference to the accompanying drawing wherein applied reference numerals indicate parts similarly identified in the following specification, the reference numeral 10 indicates a conventional truck tailgate hingedly mounted in the usual manner at its lower opposite corners to the opposite side walls at 11 of the truck box. As in the usual manner, the tailgate is swingable to a horizontal position whereat it is retained by pairs of linked arms, or chain segments, attached to the tailgate and the side walls 11.

In the carrying of a camper unit or other long load, it is highly desirable to remove the tailgate 10 for obvious reasons. Toward this end retractable hinge structures are provided, embodying the present invention, with the following description of one such structure being adequate for both as they are identical.

As best seen in FIG. 2, the rearward end of the side wall 11 of the truck box mounts, on inner and outer surfaces, plate members 13 and 14 by means of bolts 15 the latter preferably spaced as to pass through existing openings 16 in said side wall. Characteristically of different makes of trucks, the side wall 11 will be recessed at 11A to receive the hinge mounting plate.

Outer plate member 14 is apertured at 17 to receive the outer open end of a tubular housing 18 with an annular weld at 20 securing the plate 14 and the housing. An opening at 19 corresponding to aperture 17 is formed in the recessed portion 11A of the truck side wall to permit inward passage of tubular housing 18. The inner or backing plate 13 similarly defines an opening at 13A for inward extension of said housing. In the installation of the present hinge the backing plate member 13 is positioned interiorly of the truck side wall which in most instances is conveniently inserted through the tail light opening indicated at 21.

With reference again to outer plate 14 and the tubular housing 18 carried thereby, the housing slidably carries a spring urged hinge pin assembly including a retractable hinge pin 22 outwardly biased by a helical spring 23. The outer end of the hinge pin terminates in an enlarged head portion 24 of a diameter to permit seating within a cup-shaped socket or receptacle at 25 integral with the tailgate structure. The socket 25 is inset slightly from the outermost edge 26 of the tailgate to permit disengagement of the head portion 24 and socket as seen in the dashed line position of the head portion in FIG. 2. The outermost edge 26 of the tailgate as shown in FIG. 2 is rearward of head portion 24 of the hinge pin hence during tailgate detachment adequate clearance exists for tailgate end passage past head portion when the latter is in the dashed line position.

For convenient displacement of the hinge pin assembly 22 away from the tailgate receptacle 25, fingergrip release means at 27 are provided. Said means are concealed from view by the outermost, rearmost edge 26 of the tailgate which, as aforesaid, is also rearward of socket 25 to conceal same. The fingergrip shown extends radially from the head portion through a notch 25A in the receptacle 25.

The hinge pin assembly additionally includes a limit stop for outward movement of hinge pin 22 which is provided in the form of a shank 28 carried by the housing with an enlarged end at 27A. Accordingly the captive hinge pin may be moved axially against spring action during tailgate disengagement and, during normal tailgate swinging, may move rotationally within the housing 18.

To disengage the hinge pin enlargement 24 from the cup-like socket 25 of the tailgate, the fingergrip release means at 27 is simply manually moved with one hand with such disengagement being assisted by the exerting of a lifting force on the tailgate by the operator's free hand to remove the tailgates weight from the hinge pin assembly. Axial displacement of the hinge pin and its enlarged head results in adequate clearance of the latter from the socket 25. Subsequent rearward movement of the tailgate while retaining the hinge pin in a retracted position will permit detachment of the tailgate end. With like detachment of the opposite end of the tailgate the same is removed from the truck box. Mounting is accomplished in the reverse of the foregoing procedure.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. Retractable hinge structure carried by a truck side wall for swingably mounting a truck tailgate in a detachable manner, said structure comprising, a housing mounted upon the side wall structure of a truck adjacent the tailgate opening and extending interiorly of said side wall, a hinge pin assembly mounted for axial movement within said housing and extending outwardly therefrom and thereat terminating in an enlarged head portion, said head portion axially engageable with a cup-shaped receptacle carried by the tailgate, spring means axially biasing said hinge pin into tailgate engagement, and release means carried by said head portion of the hinge pin and extending radially therefrom for engagement with said cup shaped receptacle whereby the tailgate and hinge pin are coupled for rotational movement, said release means permitting manually urged movement of said hinge pin opposite to the action of spring means for axial disengagement of the hinge pin from the tailgate during tailgate removal.

2. The retractable hinge structure as claimed in claim 1 wherein the cup-shaped receptacle of the tailgate is recessed from the tailgate edge, said head portion of the release means being inwardly disposed from the tailgate edge when engaged with said receptacle and thereby concealed from view.

3. The retractable hinge structure as claimed in claim 2 wherein a limit stop limiting outward axial movement of said pin is centrally disposed within said housing.

* * * * *